US008207853B2

(12) United States Patent
Forster

(10) Patent No.: US 8,207,853 B2
(45) Date of Patent: Jun. 26, 2012

(54) HYBRID SENSOR/COMMUNICATION DEVICE, AND METHOD

(75) Inventor: Ian J. Forster, Essex (GB)

(73) Assignee: Avery Dennison Corporation, Pasadena, CA (US)

( * ) Notice: Subject to any disclaimer, the term of this patent is extended or adjusted under 35 U.S.C. 154(b) by 1138 days.

(21) Appl. No.: 12/013,520

(22) Filed: Jan. 14, 2008

(65) Prior Publication Data
US 2009/0179751 A1    Jul. 16, 2009

(51) Int. Cl.
*G08B 13/14* (2006.01)
(52) U.S. Cl. ........... 340/572.1; 340/572.4; 340/501; 340/505; 340/539.1; 340/10.41
(58) Field of Classification Search .......... 340/501, 340/505, 572.1, 572.4; 423/349; 252/500; 428/402; 427/331; 438/57, 96
See application file for complete search history.

(56) References Cited

U.S. PATENT DOCUMENTS

| | | | |
|---|---|---|---|
| 3,645,999 A * | 2/1972 | Byrd | 525/373 |
| 5,427,961 A * | 6/1995 | Takenouchi et al. | 438/96 |
| 5,973,598 A | 10/1999 | Beigel | |
| 6,077,712 A * | 6/2000 | Livingston | 436/91 |
| 6,515,919 B1 * | 2/2003 | Lee | 365/192 |
| 6,720,866 B1 * | 4/2004 | Sorrells et al. | 340/10.4 |
| 7,040,139 B2 | 5/2006 | Sunshine | 73/23.2 |
| 7,148,803 B2 * | 12/2006 | Bandy et al. | 340/539.16 |
| 7,188,767 B2 | 3/2007 | Penuela et al. | |
| 7,204,425 B2 | 4/2007 | Mosher, Jr. et al. | |
| 7,321,290 B2 * | 1/2008 | Stevens et al. | 340/10.1 |
| 7,394,382 B2 * | 7/2008 | Nitzan et al. | 340/572.8 |
| 7,473,030 B2 * | 1/2009 | Bruce et al. | 374/31 |
| 7,501,306 B2 * | 3/2009 | Nishi et al. | 438/69 |
| 7,741,592 B1 * | 6/2010 | Gonopolskiy et al. | 250/214 A |
| 7,843,316 B1 * | 11/2010 | Khieu | 340/10.1 |
| 2003/0149349 A1 * | 8/2003 | Jensen | 600/372 |
| 2003/0173408 A1 | 9/2003 | Mosher, Jr. et al. | |

(Continued)

FOREIGN PATENT DOCUMENTS
DE    101 58 195    6/2003

OTHER PUBLICATIONS

Ho, Clifford K., et al., "Review of Chemical Sensors for In-Situ Monitoring of Volatile Contaminants", Sandia Report, Sandia National Laboratories, SAND2001-0643, (2001), pp. 1-34.

(Continued)

*Primary Examiner* — Daniel Wu
*Assistant Examiner* — Son M Tang
(74) *Attorney, Agent, or Firm* — Avery Dennison Corporation

(57) ABSTRACT

A hybrid sensor/communication device includes a radio frequency identification (RFID) communication device coupled to a sensor device that includes organic and/or amorphous semiconductor material. The organic and/or amorphous semiconductor material may be printed atop a substrate of the device, the same substrate upon which antenna elements of the RFID device are located. The organic and/or amorphous semiconductor material may form an organic/amorphous semiconductor material processor that is coupled to sensor pads of the sensor device. An integrated circuit of the RFID device, which may be a part of an interposer or strap, and which may utilize an inorganic crystalline semiconductor material such as crystalline silicon, is coupled to the organic/amorphous semiconductor material processor. The RFID device provides power to the sensor device, and allows communication between the sensor device and external devices outside of the hybrid sensor/communication device.

18 Claims, 6 Drawing Sheets

U.S. PATENT DOCUMENTS

| | | | |
|---|---|---|---|
| 2006/0055531 A1* | 3/2006 | Cook et al. | 340/539.22 |
| 2007/0020445 A1* | 1/2007 | Liu et al. | 428/195.1 |
| 2007/0229228 A1* | 10/2007 | Yamazaki et al. | 340/10.34 |
| 2007/0273515 A1* | 11/2007 | MacKenzie et al. | 340/572.1 |
| 2009/0010833 A1* | 1/2009 | Rosenband et al. | 423/349 |

OTHER PUBLICATIONS

"Discrete Semiconductors, Silicon Sensors for Temperature Measurement", Philips, Philips Semiconductors, (2006), pp. 1-18.

Roveti, Denes K., "Choosing a Humidity Sensor: A Review of Three Technologies", Sensors, (2001), [retrieved online Jan. 9, 2008], <http.//www.sensormag.com/sensors/content/printContentPopup.jsp?id=322590>.

International Search Report and Written Opinion issued in corresponding PCT/US2009/030788 dated May 25, 2009.

\* cited by examiner

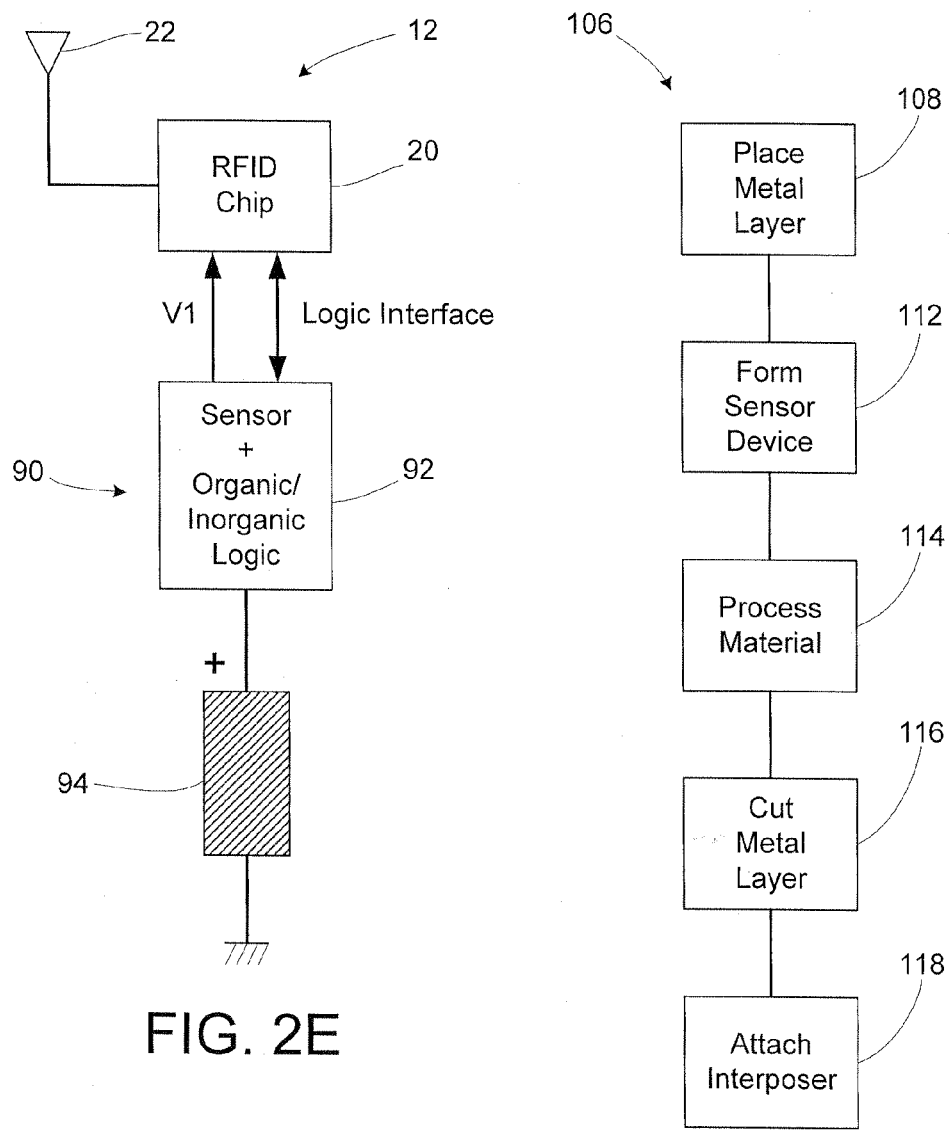
FIG. 2E
FIG. 4
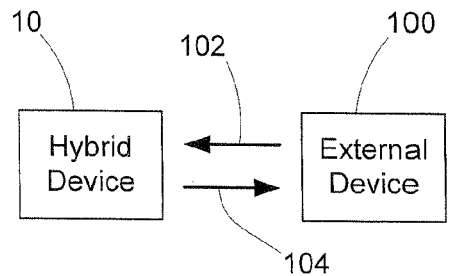
FIG. 3

HYBRID SENSOR/COMMUNICATION DEVICE, AND METHOD

BACKGROUND OF THE INVENTION

1. Field of the Invention

The invention is in the field of sensor devices and communication devices.

2. Description of the Related Art

Radio frequency identification (RFID) tags and labels (collectively referred to herein as "devices") are widely used to associate an object with an identification code or other information. RFID devices generally have a combination of antennas and analog and/or digital electronics, which may include for example communications electronics, data memory, and control logic. For example, RFID tags are used in conjunction with security locks in cars, for access control to buildings, and for tracking inventory and parcels.

Sensor devices have been used to detect a wide variety of physical parameters. Improvements are possible in both the fields of sensor devices and communication devices.

SUMMARY OF THE INVENTION

According to an aspect of the invention, a hybrid sensor/communication device includes a sensor device that includes at least one of an organic or amorphous semiconductor material, and a radio frequency identification (RFID) device operatively coupled to the sensor device.

According to another aspect of the invention, a hybrid sensor/communication device includes: a radio frequency identification (RFID) communication device, wherein the RFID device includes: an antenna; and a crystalline inorganic semiconductor integrated circuit coupled to the antenna to facilitate communication to devices external to the hybrid device; and a sensor device operatively coupled to the crystalline inorganic semiconductor integrated circuit. The sensor device includes at least one of an organic semiconductor material or an amorphous inorganic semiconductor material.

According to yet another aspect of the invention, a method of making a hybrid sensor/communication device includes the steps of: forming a sensor device on a metal layer, wherein the sensor device includes at least one of an organic semiconductor material or an amorphous inorganic semiconductor material; removing part of the metal layer, to separate an antenna of the metal layer from one or more metal pieces of the metal layer upon which the sensor device is located; and coupling a crystalline inorganic semiconductor integrated circuit to the antenna, to thereby produce a radio frequency identification (RFID) communication device operatively coupled to the sensor device.

According to still another aspect of the invention, a method of sensing and communicating includes the steps of: providing a hybrid sensor/communication device that includes both a radio frequency identification (RFID) communication device that has a crystalline inorganic semiconductor integrated circuit, and a sensor device operatively coupled to the semiconductor integrated circuit, wherein the sensor device includes at least one of an organic semiconductor material or an amorphous inorganic semiconductor material; sensing one or more physical parameters using the sensor device; and communicating information regarding the one or more physical parameters from the RFID device to an external device that is physically separated from the hybrid device.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale:

FIG. 2E is a block diagram showing parts of a hybrid sensor/communication device in accordance with still another embodiment of the present invention;

FIG. 3 is a schematic diagram illustrating communication between the hybrid device of FIG. 1, and an external device;

FIG. 4 is a high-level flow chart illustrating steps in a method of forming the hybrid device of FIG. 1;

DETAILED DESCRIPTION

A hybrid sensor/communication device includes a radio frequency identification (RFID) communication device coupled to a sensor device that includes organic and/or amorphous semiconductor material. The organic and/or amorphous semiconductor material may be printed atop a substrate of the device, the same substrate upon which antenna elements of the RFID device are located. The organic and/or amorphous semiconductor material may form an organic/amorphous semiconductor material processor that is coupled to sensor pads of the sensor device. An integrated circuit of the RFID device, which may be a part of an interposer or strap, and which may utilize an inorganic crystalline semiconductor material such as crystalline silicon, is coupled to the organic/amorphous semiconductor material processor. The RFID device provides power to the sensor device, and allows communication between the sensor device and external devices outside of the hybrid sensor/communication device. The RFID device may be configured to provide different voltages to operate the RFID device's integrated circuit and the sensor's organic/amorphous semiconductor material processor. The power for operating both the integrated circuit and sensor processor may be provided by rectifying energy received by the antenna elements of the RFID device.

Figure 1:
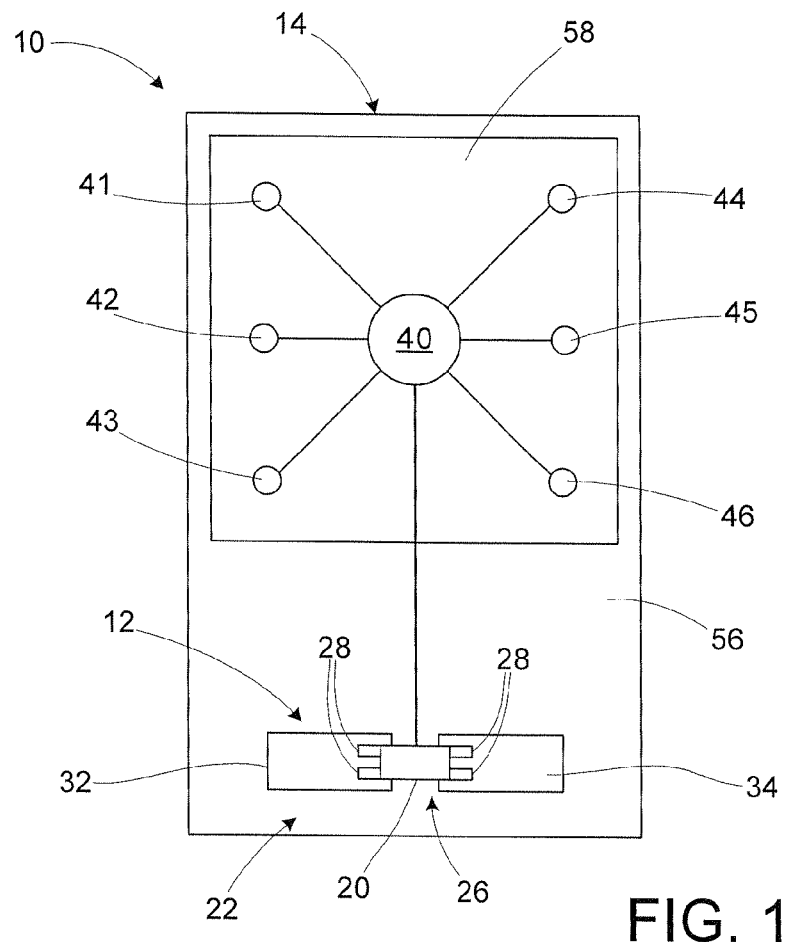
FIG. 1 is a plan view of a hybrid sensor/communication device in accordance with an embodiment of the present invention.

FIG. 1 shows a hybrid sensor/communication device 10 that includes an RFID communication device 12 and a sensor device 14. The devices 12 and 14 are coupled together to provide power to the sensor device 14, and to allow communication of information between the devices 12 and 14. The RFID device 12 includes an integrated circuit or chip 20, and an antenna 22 that is electrically coupled to the chip 20. The chip 20 may be part of an interposer or strap 26 that has conductive leads 28 that are electrically coupled to both the antenna 22 and to the chip 20. The conductive leads 28 are electrically coupled to contacts of the chip 20, and provide an electrical connection between the chip 20 and the antenna 22. The electrical connection between the chip 20 and the antenna 12 may be a direct ohmic conductive path, or alternatively may include capacitive or other indirect types of electrical connection. The strap 26 may be mounted to the antenna 22 in a face-up or face-down configuration. Alternatively the chip 20 may be electrically coupled to the antenna 22, without any conductive leads or other parts of an interposer.

The antenna 22 may have any of a variety of suitable configurations. In the illustrated embodiment the antenna 22 is shown as a dipole antenna, with a pair of antenna elements 32 and 34. However, it will be appreciated that the antenna 22 alternatively may have a different configuration, for example being a slot antenna, a loop antenna, a notch antenna, or some other suitable type or combination of antenna types.

The sensor device 14 includes an organic and/or amorphous semiconductor processor 40 and sensor pads 41-46. The organic and/or amorphous semiconductor processor 40 may be made of layers of printed organic and/or amorphous semiconductor material, as described further below. The layers of organic and/or amorphous semiconductor material alternatively may be vacuum deposited.

Suitable organic semiconductor materials for use in this invention include oligomers and polymers with semiconductor properties. Examples of semiconductor oligomers are pentacene and anthracene. An example of a semiconductor polymer is polyacetylene. Other possible organic semiconductor materials include polythiophene, phthalocyanine, poly(3-hexylthiophene), poly(3-alkylthiophene), α-ω-hexathiophene, α-ω-di-hexyl-hexathiophene, polythienyle-nevinylene, bis(dithienothiophene), α-ω-dihexyl-quater-thiophene, dihexyl-anthradithiophene, n-decapentafluoroheptyl-methylnaphthalene-1,4,5,8-tetra-carboxylic diimide, and α-ω-dihexyl-quinquethiophene. A suitable amorphous semiconductor material is amorphous silicon.

The organic/amorphous semiconductor processor 40 receives and perhaps processes data from the sensor pads 41-46. The organic/amorphous semiconductor processor 40 is also coupled to the chip 20. The link between the processor 40 and the chip 20 allows for communication between the devices 12 and 14. For example, information on physical properties detected by the sensor pads 41-46 may be routed through the processor 40 to the chip 20. In addition the link between the processor 40 and the chip 20 may be used to provide power to the sensor device 14. This power may be generated by the RFID device 12 rectifying incoming energy received by the antenna 22.

The sensor pads 41-46 may be sensors for sensing any of a variety of physical conditions and/or events. Examples are sensor pads used to sense the presence or absence one or more enzymes in biological materials, a specific protein, or other biological material or genetic sequence; chemical sensors such as for detecting by-products of chemical decompositions; magnetic field sensors; electric field sensors; and integrated temperature/time monitors. Other possibilities for the sensor pads 41-46 include optical sensors, heat sensors, pressure sensors, humidity sensors, and acoustic sensors. Further details regarding such sensors may be found in numerous publications, for example "Choosing a Humidity Sensor: A Review of Three Technologies," by Denes K. Roveti, available at http://www.sensorsmag.com/sensors/Technology+Tutorials%2FSensors%2FHumidity%2FMoisture/Choosing-a-Humidity-Sensor-A-Review-of-Three-Techn/ArticleStandard/Article/detail/322590, and "Review of Chemical Sensors for In-Situ Modeling of Volatile Contaminants, by Clifford K. Ho et al. Broadly the sensor device 14 can be said to detect one or more physical parameters or properties, such as those listed above, or the absence or presence of a specific material.

The antenna 22, the organic/amorphous semiconductor processor 40, and the sensor pads 41-46 are located on a substrate 56 of the device 10. The substrate 56 may be a sheet of any of a variety of suitable materials, such as suitable polymer materials and paper. The antenna 22 may be an aluminum foil that is adhesively or otherwise fixed to the substrate 56. The organic/amorphous semiconductor processor 40 and the sensor pads 41-46 may be directly deposited on the substrate 56, or alternatively may be deposited on a suitable intermediate material, such as one or more metal pieces 58 on the substrate 56. The metal pieces 58 may be parts of an aluminum foil layer, the same layer used for making the antenna 22, as described further below. The organic/amorphous semiconductor may be printed or deposited in a desired configuration. It will be appreciated that a variety of suitable printing operations may be used to deposit the processor 40 and/or the sensor pads 41-46. Deposition may include vacuum coating, spraying, spinning or other suitable methods of depositing a controlled layer, which may be used in conjunction with some form of masking.

The connections between the processor 40 and the sensor pads 41-46, and between the sensor processor 40 and the RFID chip 20, may be any of a variety of suitable conductive connections. Suitable conductive material may be deposited and/or configured as part of the process of making the device 10.

Figure 2A:
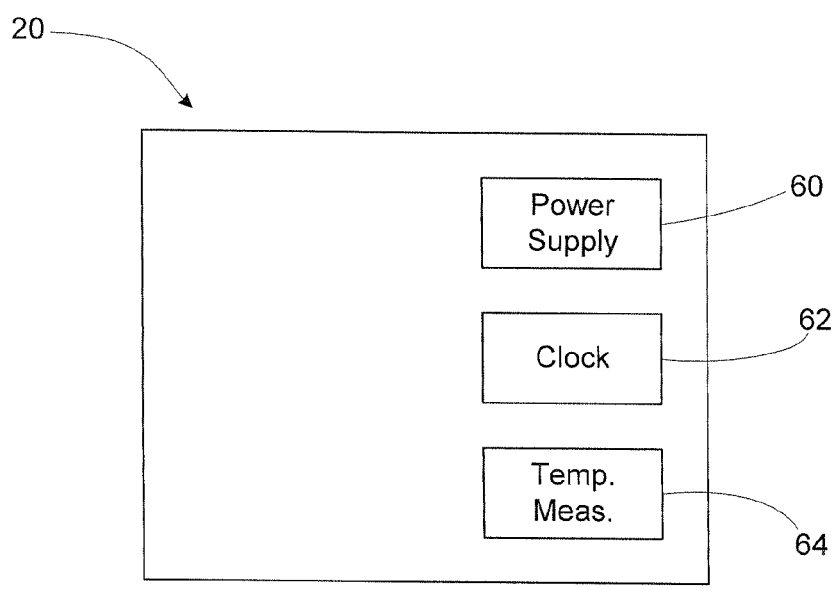
FIG. 2A is a schematic diagram of an RFID chip of the device of FIG. 1.

With reference in addition to FIG. 2A, the chip 20 has a power supply 60 that is configured to rectify energy received by the antenna 22 to provide power to both the chip 20 and the organic/amorphous semiconductor processor 40. The power supply 60 is configured to that generate power at two voltage levels, suitable for the different types of processors that use different materials. The higher voltage power is used to power the organic/amorphous semiconductor processor 40. The lower voltage power is used to power the crystalline inorganic semiconductor chip 20. The different voltages are used because the different materials of the chip 20 and the processor 40 need different voltages to operate, due to their different materials. The power supply 60 contains suitable components, such as rectifiers and charge pumps, to provide the voltages needed by the chip 20 and the processor 40.

The chip 20 may also have an internal clock 62 that may be used to provide accurate timing for data received from the sensor pads 41-46, and combined or otherwise processed by the organic semiconductor processor 40. Timing data may alternatively be provided by an external device in communication with the RFID device 12.

The chip 20 may also include a temperature measurement device 64. The temperature measurement device 64 may be integrated with the chip 20, built into the inorganic semiconductor material of the chip 20. Basic diode temperature measurements may be determined from the Shockley diode equation. A diode forward voltage is partly dependant on absolute temperature at a defined current. This forward voltage makes a very simple temperature sensor. More sophisticated temperature measurements were available, such as those described in "Silicon Sensors for Temperature Measurements," available at http://www.nxp.com/acrobat_download/various/SC17_GENERAL_TEMP_4.pdf. The temperature measurement device 64 may be used to provide an accurate temperature determination in order to compensate for temperature-related variations in the output of the sensor pads 41-46. The compensation may be performed in either the chip 20 or the organic semiconductor processor 40. It will be appreciated that the temperature measurement device 64 may alternatively be separate from the chip 20.

Figure 2B:
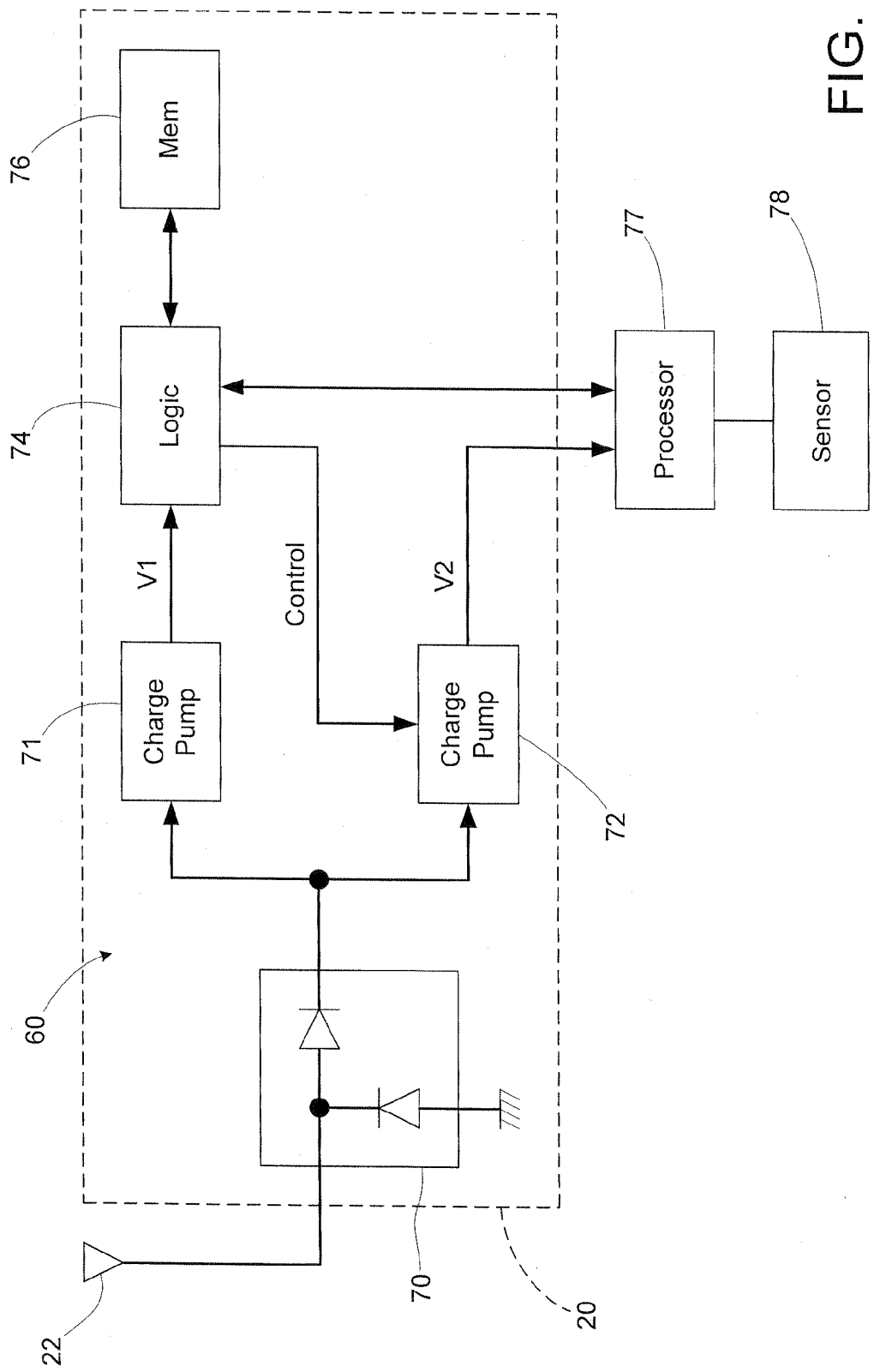
FIG. 2B is a block diagram showing parts of a hybrid sensor/communication device in accordance with an embodiment of the present invention, showing a configuration of a power supply of the device.

FIGS. 2B-2E shows several configurations for the power supply 60. FIG. 2B shows a power supply 60 with a rectifier 70 coupled to an antenna 22. Output from the rectifier 70 is split between two separate charge pumps 71 and 72. Output V1 from the first charge pump 71 is used to drive logic 74 of the RFID device in crystal silicon. The logic 74 is coupled to a memory 76. Output V2 from the second charge pump 72 is used for an amorphous/organic device, for example including an amorphous/organic processor 77 and a sensor 78. The second charge pump 72 is controlled by the RFID chip logic 74. The RFID logic 74 also interfaces with the amorphous/organic processor 77 and the sensor 78.

Figure 2C:
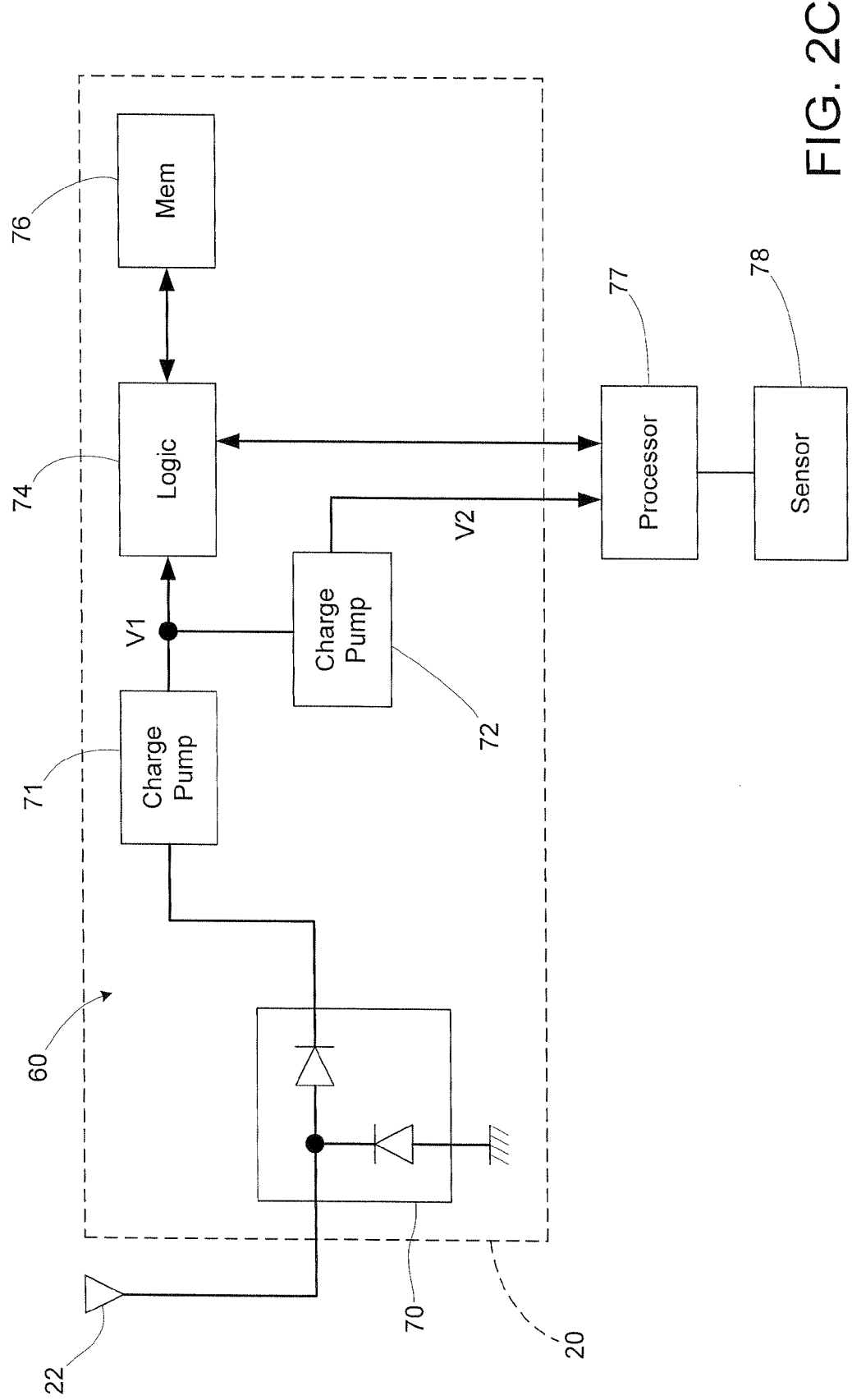
FIG. 2C is a block diagram showing parts of a hybrid sensor/communication device in accordance with another embodiment of the present invention, showing another configuration of a power supply of the device.

FIG. 2C shows a variant in which the second charge pump 72 is used to pump up the output voltage V1 from the first charge pump 71. The output V2 from the second charge pump 72 is used to power the amorphous/organic processor 77 and the sensor 78.

Figure 2D:
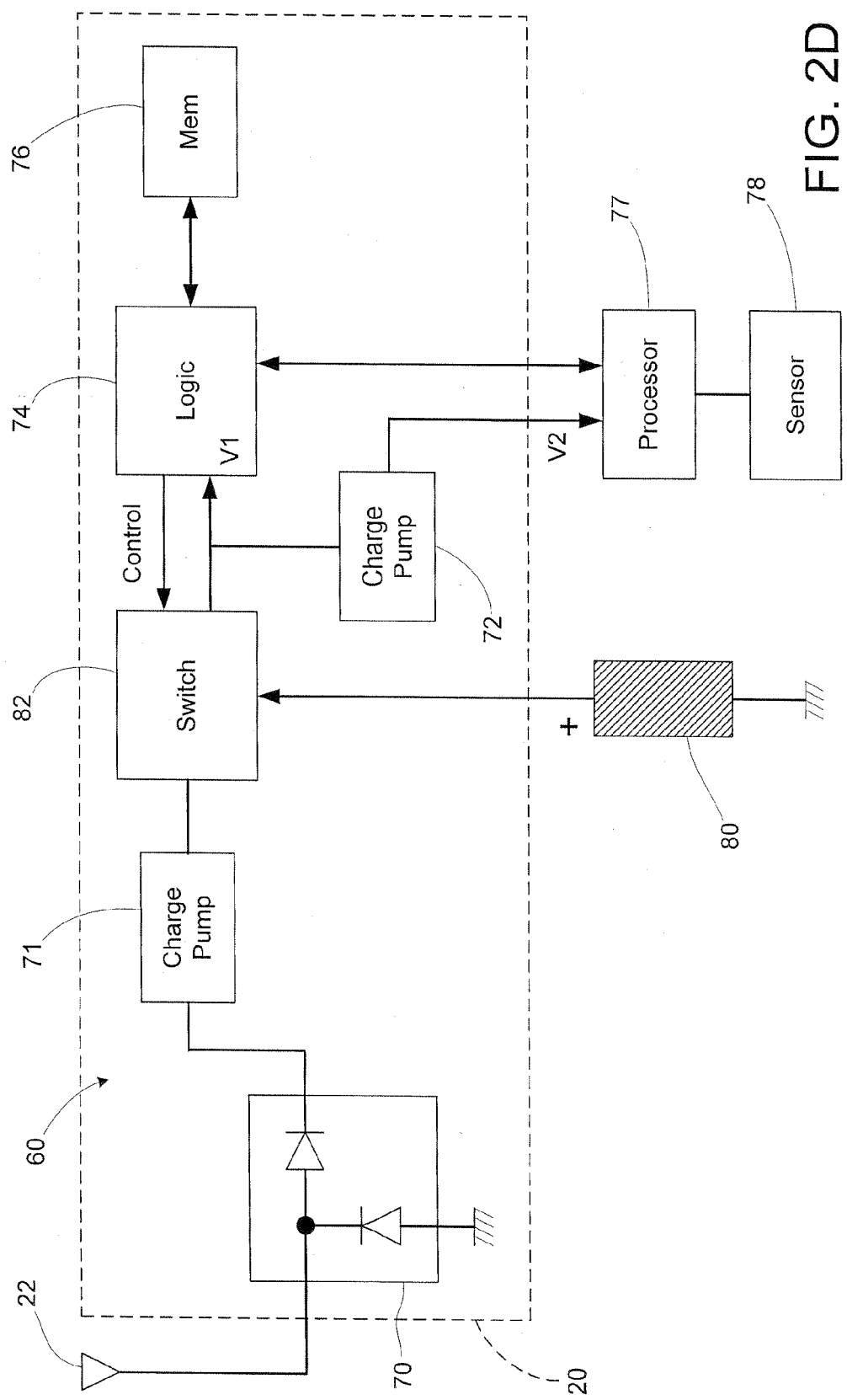
FIG. 2D is a block diagram showing parts of a hybrid sensor/communication device in accordance with yet another embodiment of the present invention, showing yet another configuration of a power supply of the device.

FIG. 2D shows a power supply with an added battery 80 coupled to a switch 82. The battery 80 can be a thin film device formed on the same substrate or potentially using the antenna conductor as one of its electrodes. The switch 82 allows power to be provided to the logic 74 from the battery 80. If enough power is available from the antenna 22, or if the battery 80 is discharged, power comes from the rectifier 70, and power can be controllably supplied to the amorphous/organic processor 77 and the sensor 78. The RFID chip 20 may be "off," or in a very low power standby state, with the battery 80 supplying power to the amorphous/organic processor 77 and the sensor 78. The RFID chip 20 may wake up from its standby state when an event occurs, such as the voltage on its sensor input exceeding a threshold. Typically this would allow the chip to wake up when a defined event occurred, such as a temperature being exceeded. The event or information about it may be recorded into the memory 76, along with a time signature obtained from a low power clock.

FIG. 2E shows another arrangement where a sensor/processor 90 has organic/amorphous circuits 92, possibly both analogue and digital, as well as a sensor. When a defined event occurs, the sensor logic 92 provides power form the battery 94 to the RFID device 12. The power may be provided either via a standard communication port or by emulating normal communications between a reader and a chip 20. The power enables the RFID device 12 to write data into the memory of the RFID chip 20, which can then be accessed remotely from a reader. An alternate version of this has the RFID chip 20 powered by the battery 94 to make the device semi-passive for extended range.

Referring now to FIG. 3, the hybrid sensor/communication device 10 may interact with an external device 100 that communicates with the hybrid device 10. The external device 100 may be a reader, detector, or interrogator, that is physically separated from the hybrid device. The external device 100 may send RF signals 102 that are picked up by the RFID device 12 of the hybrid device 10. The incoming RF signals 102 may be used to power the RFID device 12 and/or the sensor device 14. In addition the incoming RF signals 102 may be used to communicate with the hybrid device 10, for example by providing information to the hybrid device 10. The RFID device 12 may send outgoing signals 104 in return. The outgoing signals 104 may be broadcast from the RFID device 12, or alternatively may involve modulation of signals sent by the external device 100. Such modulation may be detectable by the external device 100, allowing information to be communicated from the hybrid device 10. The information communicated by the hybrid device 10 may include information received by the sensor pads 41-46, regarding what the sensor pads 41-46 have detected. It will be appreciated that a wide variety of other information may also be communicated from the hybrid device 10 to the external device 100.

The hybrid sensor/communication device 10 provides many advantages over single-function RFID devices and sensor devices. The RFID device 12 provides the sensor device 14 with the ability for rapid and reliable communication with external devices. The use of silicon or other inorganic crystalline semiconductors in the chip 22 allows higher data communication than would be possible with communication with organic/amorphous devices alone.

The device 10 also advantageously allows accurate timing to be kept for data from the sensor device 14. As discussed above, the timing may be provided either from the RFID chip 20 or from a signal from the external device 100. Internal timing provided by the organic/amorphous semiconductor processor 40 would be less accurate than timing provided by either the crystalline inorganic semiconductor chip 20 or from an external device.

The hybrid device 10 may advantageously correct the results from some or all of the sensor pads 41-46 for the environmental temperature, based on input from the crystalline inorganic semiconductor temperature measurement device 64 in the RFID chip 20 (or elsewhere in the RFID device 12). Crystalline inorganic semiconductor devices can measure temperature more accurately than organic/amorphous devices. This allows the hybrid device 10 to potentially more accurately adjust sensor results than is possible for organic/amorphous-semiconductor-only devices.

The hybrid device 10 may be configured using an off-the-shelf chip 20 or strap or interposer 26. This may be combined with an easily customizable configuration for the sensor device 14. It will be appreciated that the hybrid device 10 may have a customizable configuration at a low cost, by combining off-the-shelf RFID devices (or components) with a custom sensor device configuration. The sensor device 14 may be custom configured at a low cost, since it involves printed layers. In addition, amorphous/organic semiconductor materials may be unsuitable for coupling to a chip. Organic/amorphous semiconductor materials may not be compatible with the resolution and temperature requirements for direct chip attach. Use of the separate antenna 22 facilitates attachment of the chip 20 or the strap or interposer 26.

Figure 5:
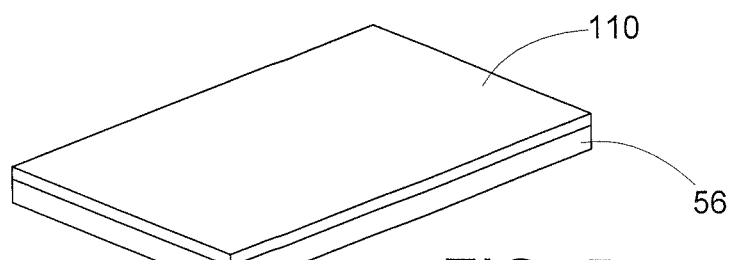
FIG. 5 is a diagram illustrating one step of the method of FIG. 4.

FIG. 4 shows a high-level flow chart of steps in a method 106 for producing the hybrid device 10. In step 108, illustrated in FIG. 5, a metal layer 110 is placed on the substrate 56. The metal layer 110 may be an aluminum foil layer. The metal layer 110 may be adhesively attached onto the substrate 56.

Figure 6:
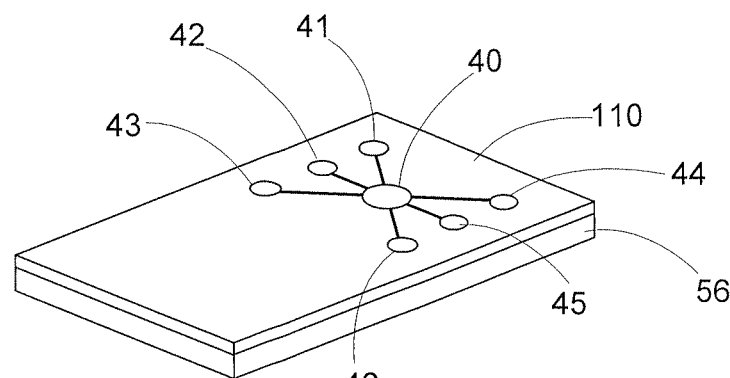
FIG. 6 is a diagram illustrating another step of the method of FIG. 4.

In step 112, illustrated in FIG. 6, the sensor device 14 is formed on the metal layer 110, such as an aluminum or other metal foil layer. As discussed above, the organic/amorphous semiconductor processor 40 and the sensors pads 41-46 may be printed on the metal layer 110. After the forming, the organic/amorphous semiconductor material is processed further in step 114, such by drying or heating.

Figure 7:
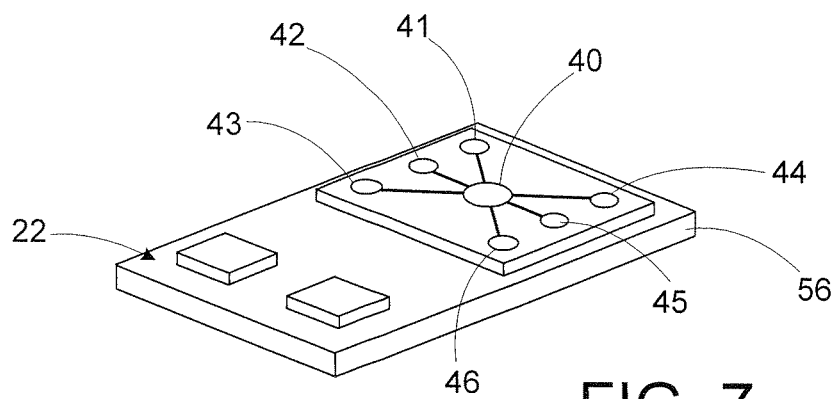
FIG. 7 is a diagram illustrating still another step of the method of FIG. 4.

Thereafter in step 116 the metal layer 110 is die cut or otherwise cut to remove material other than the metal pieces 58 and the antenna elements 32 and 34. The resulting structure is shown in FIG. 7. Finally, in step 118 the strap or interposer 26 is attached to the antenna elements 32 and 34, producing the hybrid device shown in FIG. 1.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hybrid sensor/communication device comprising:
    a radio frequency identification (RFID) communication device, wherein the RFID device includes:
        an antenna;
        a crystalline inorganic semiconductor integrated circuit coupled to the antenna to facilitate communication to devices external to the hybrid sensor/communication device; and
        a power supply;
    a sensor device operatively coupled to the crystalline inorganic semiconductor integrated circuit;
    wherein the sensor device includes at least one of an organic semiconductor material or an amorphous inorganic semiconductor material;
    wherein the sensor device includes a processor that includes the at least one of the organic semiconductor material or the amorphous inorganic semiconductor material;
    wherein the RFID device may be configured to provide different voltages to operate the RFID device's integrated circuit and one of the sensor's organic or amorphous inorganic semiconductor material processor;
    wherein the RFID integrated circuit and the sensor device processor are composed of two different materials; and
    wherein a higher voltage is used to power the organic or amorphous semiconductor material processer and a lower voltage is used to power the crystalline inorganic semiconductor integrated circuit.

2. The hybrid sensor/communication device of claim 1, wherein the sensor device includes the organic semiconductor material.

3. The hybrid sensor/communication device of claim 2, wherein the organic semiconductor material includes oligomers or polymers selected from the group comprising pentacene, anthracene, polyacetylene, polythiphere, phthalocyanine, poly(3-hexylthiophene), poly(3-alkylthiophene), $\alpha$-$\omega$-di-hexyl-hexathiophene, polythienyle-nevinylene, bis(dithienothiophene), $\alpha$-$\omega$-di-hexyl-quaterthiphene, di-hexyl-anthradithiophene, n-decapentafluoroheptyl-methylnaphthalene-1,4,5,8-tetra-carboxylic diimide, and $\alpha$-$\omega$-di-hexyl-quinquethiophene.

4. The hybrid sensor/communication device of claim 1, wherein the sensor device includes the amorphous inorganic semiconductor material.

5. The hybrid sensor/communication device of claim 4, wherein the amorphous inorganic semiconductor material includes amorphous silicon.

6. The hybrid sensor/communication device of claim 1, wherein the sensor device also includes one or more sensor pads that are operatively coupled to the processor.

7. The hybrid sensor/communication device of claim 6, wherein the processor is operatively coupled to the crystalline inorganic semiconductor integrated circuit.

8. The hybrid sensor/communication device of claim 6, wherein the one or more sensor pads includes one or more of an enzyme sensor, a chemical sensor, an integrated temperature/time monitor, an optical sensor, a heat sensor, a pressure sensor, a humidity sensor, an electromagnetic sensor, and an acoustic sensor.

9. The hybrid sensor/communication device of claim 1, wherein the crystalline inorganic semiconductor integrated circuit is part of an interposer that includes conductive leads that are coupled to both the crystalline inorganic semiconductor integrated circuit and the antenna.

10. The hybrid sensor/communication device of claim 1, wherein the antenna is metal foil antenna.

11. The hybrid sensor/communication device of claim 10, wherein the sensor device is formed on one or more metal pieces.

12. The hybrid sensor/communication device of claim 11, wherein the one or more metal pieces and the metal foil antenna are cut from a single metal foil layer.

13. The hybrid sensor/communication device of claim 11, further comprising a substrate that is attached to the metal foil antenna and the one or more metal pieces.

14. The hybrid sensor/communication device of claim 1, wherein the at least one of the organic semiconductor material or the amorphous inorganic semiconductor material includes a printed material.

15. The hybrid sensor/communication device of claim 1, wherein the RFID device includes a power supply that provides a high voltage and a low voltage, with one of the voltages used for internal operation of the crystalline inorganic semiconductor integrated circuit, and one of the voltages the other used for operation of the sensor device.

16. The hybrid sensor/communication device of claim 15, wherein the power supply is operatively coupled to the antenna so as to rectify energy received by the antenna to produce the high voltage and the low voltage.

17. A method of sensing and communicating, the method comprising:
    providing a hybrid sensor/communication device that includes a radio frequency identification (RFID) communication device that has a crystalline inorganic semiconductor integrated circuit, and a sensor device operatively coupled to the semiconductor integrated circuit, wherein the sensor device includes at least one of an organic semiconductor material or an amorphous inorganic semiconductor material, and a power supply configured to provide different voltages to operate the RFID device's integrated circuit and one of the sensor's organic or amorphous inorganic semiconductor material processor wherein the RFID integrated circuit and the sensor device processor are composed of two different materials; and wherein a higher voltage is used to power the organic or amorphous semiconductor material processer and a lower voltage is used to power the crystalline inorganic semiconductor integrated circuit;

sensing one or more physical, chemical or biological parameters using the sensor device; and communicating information regarding the one or more physical, chemical or biological parameters from the RFID device to an external device that is physically separated from the hybrid device.

18. The method of claim 17, wherein a processor of the sensor device includes the at least one of the organic semiconductor material or the amorphous inorganic semiconductor material.

* * * * *